Figure 1:
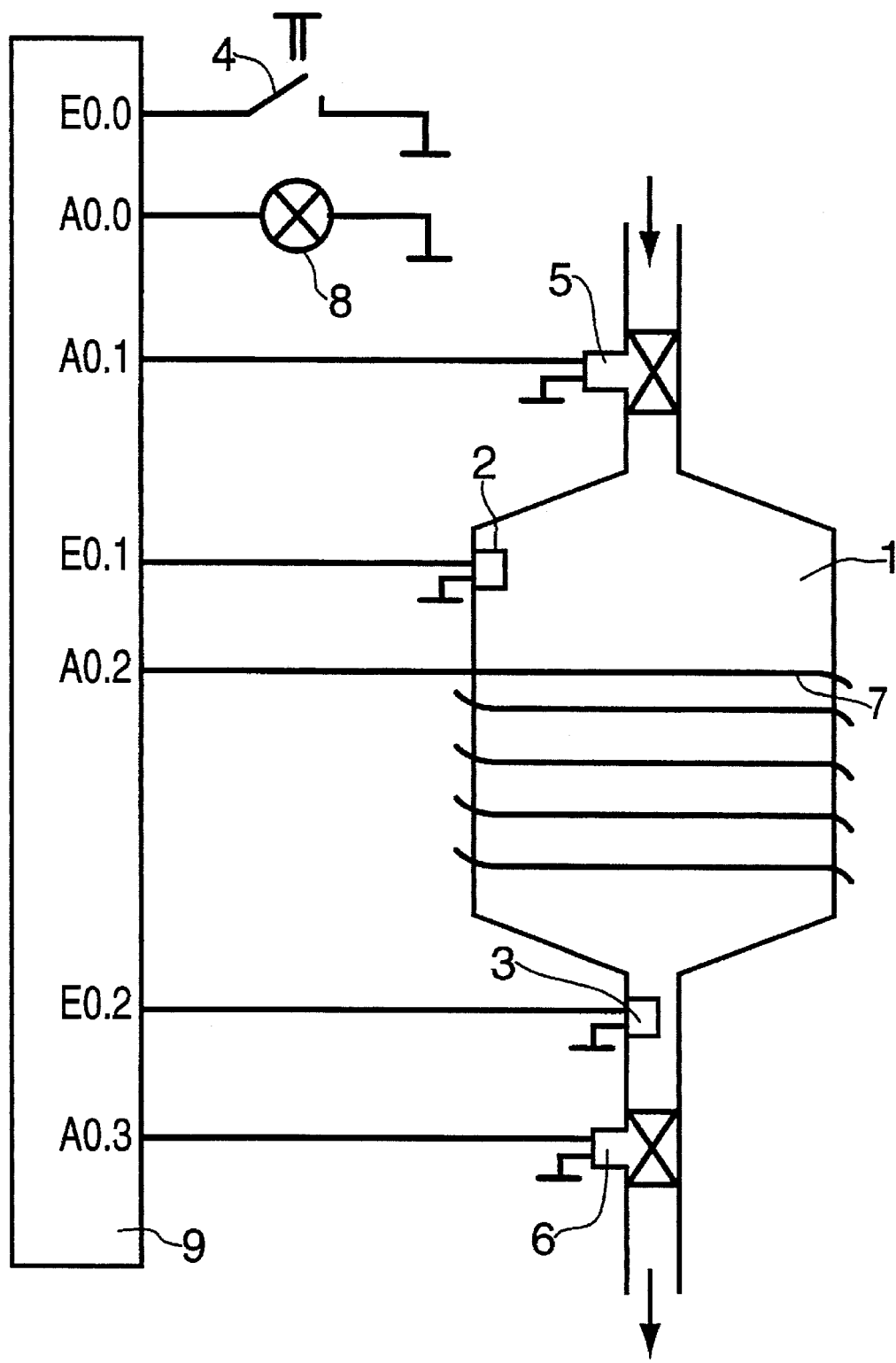

United States Patent [19]

Hallwirth

[11] Patent Number: 5,648,899
[45] Date of Patent: Jul. 15, 1997

[54] PROGRAMMING MACHINE

[75] Inventor: Volker Hallwirth, St. Georgen, Germany

[73] Assignee: Siemens Aktiengesellschaft, Germany

[21] Appl. No.: 416,877

[22] PCT Filed: Oct. 13, 1993

[86] PCT No.: PCT/DE93/00981

§ 371 Date: Apr. 19, 1995

§ 102(e) Date: Apr. 19, 1995

[87] PCT Pub. No.: WO94/09414

PCT Pub. Date: Apr. 28, 1994

[30] Foreign Application Priority Data

Oct. 20, 1992 [DE] Germany .......................... 42 35 342.4

[51] Int. Cl.⁶ .................................................. G06F 19/00
[52] U.S. Cl. .................. 364/191; 364/147; 364/926.9; 364/949; 364/927.2; 364/927.4; 395/701

[58] Field of Search ................... 364/147, 926.9, 364/927.4, 191; 395/700

[56] References Cited

U.S. PATENT DOCUMENTS

| | | | |
|---|---|---|---|
| 5,177,420 | 1/1993 | Wada et al. | 318/568 |
| 5,392,444 | 2/1995 | Inoue | 395/800 |
| 5,566,320 | 10/1996 | Hubert | 395/474 |

*Primary Examiner*—Kevin A. Kriess
*Assistant Examiner*—Majid A. Banankhah
*Attorney, Agent, or Firm*—Kenyon & Kenyon

[57] ABSTRACT

A programming machine for a storage-programmable state controller and a method for creating a control program for a storage-programmable state controller. A software tool is used to develop a control task, in the form of an action-time diagram, is stored in memory and is displayable. The control task is then converted to a control program with control codes and status codes. The invention has applications in programming machines for storage programmable controls.

4 Claims, 3 Drawing Sheets

PROGRAMMING MACHINE

The invention relates to a programming unit for a storage-programmable state control.

The German laid open print 37 43 438 discloses a device, which, in accordance with an instantaneous state and an input vector assignment of digital process input variables, effects a transition into a sequential state and a transfer of new control data to an output stage.

The older German Patent Application P 42 26 456.1 describes a storage-programmable state control, which renders possible a state transition from an instantaneous state into a sequential follow up state for a plurality of processors. With this state control, i.e., with this known device, reaction times to changes in the input data are substantially shortened in comparison to an ordinary programmable controller, which during the control operation gradually reads out individual instructions of the control program from a memory in accordance with a processing by a Von-Neumann machine, interprets these and finally executes the appropriate operations.

A programming unit is known from the printed publication, "Automatisieren mit SIMATIC S5-155U" {Automating with SIMATIC S5-155U}, Hans Berger, 1989, which converts a control task into a control program for a programmable controller. All the functions of the control task are programmed or are described by a method of representation: "list of instructions", "sequential function chart", or "ladder diagram". The programming unit converts the programmed functions independently of the methods of representation into a corresponding machine code. This code contains all control functions programmed by the user and is read and interpreted by the programmable controller after the code has been transmitted to the programmable controller. When this known programming unit is used, it is only possible to create a control program for a storage-programmable state control by expending considerable time and energy for programming.

The object of the present invention is to produce a programming unit, which will simplify a programming of a control program in a storage-programmable state control.

This objective is solved by a programming unit for a storage-programmable state control with a memory device, in which is stored a control task created with a software tool in the form of an action-time diagram, which is displayable on a display device and describes input and output signals of a technical process to be controlled in the form of binary and/or analog signals, and which is further processed by means of the software tool to create a control program having control and status codes to solve the control task starting out from an instantaneous state in accordance with the following steps:

Searching for the instants ti (i=0, 1 ... ), at which signal level transitions of the input signals occur;

Searching for the signal level value of the input signal exhibiting the level transition determined at any one time at an instant $ti+\Delta ta$, $\Delta ta$ being a first specifiable time span;

Searching for the signal level values of the remaining input signals at an instant $ti-\Delta tb$, $\Delta tb$ being a second specifiable time span;

Searching for the signal level values of the output signals at the instant $ti+\Delta ta$;

Generating an input vector from the signal level values of the input signals that were searched for;

Generating a control data vector from the signal level values of the output signals that were searched for;

Allocation of the input vector to a sequential follow-up state at the instant $ti+\Delta ta$.

It is especially advantageous that even a complex control program can be programmed very simply. The programmer creates a generally known action-time diagram, which describes input and output signals of a technical process to be controlled in the form of binary and/or analog signals. If the action-time diagram exhibits analog input and output signals, then a threshold must be established for characterizing a level transition. The corresponding input-, control and status codes of the control program for the state control are generated from this action-time diagram. It is not necessary to have a knowledge of a programming language or of the customary methods for representing a control task in automation technology.

Further advantageous refinements of the invention are revealed in the dependent claims.

On the basis of the drawing, in which one exemplary embodiment of the invention is shown, the invention, its refinements and advantages will be clarified in greater detail.

Figure 2:
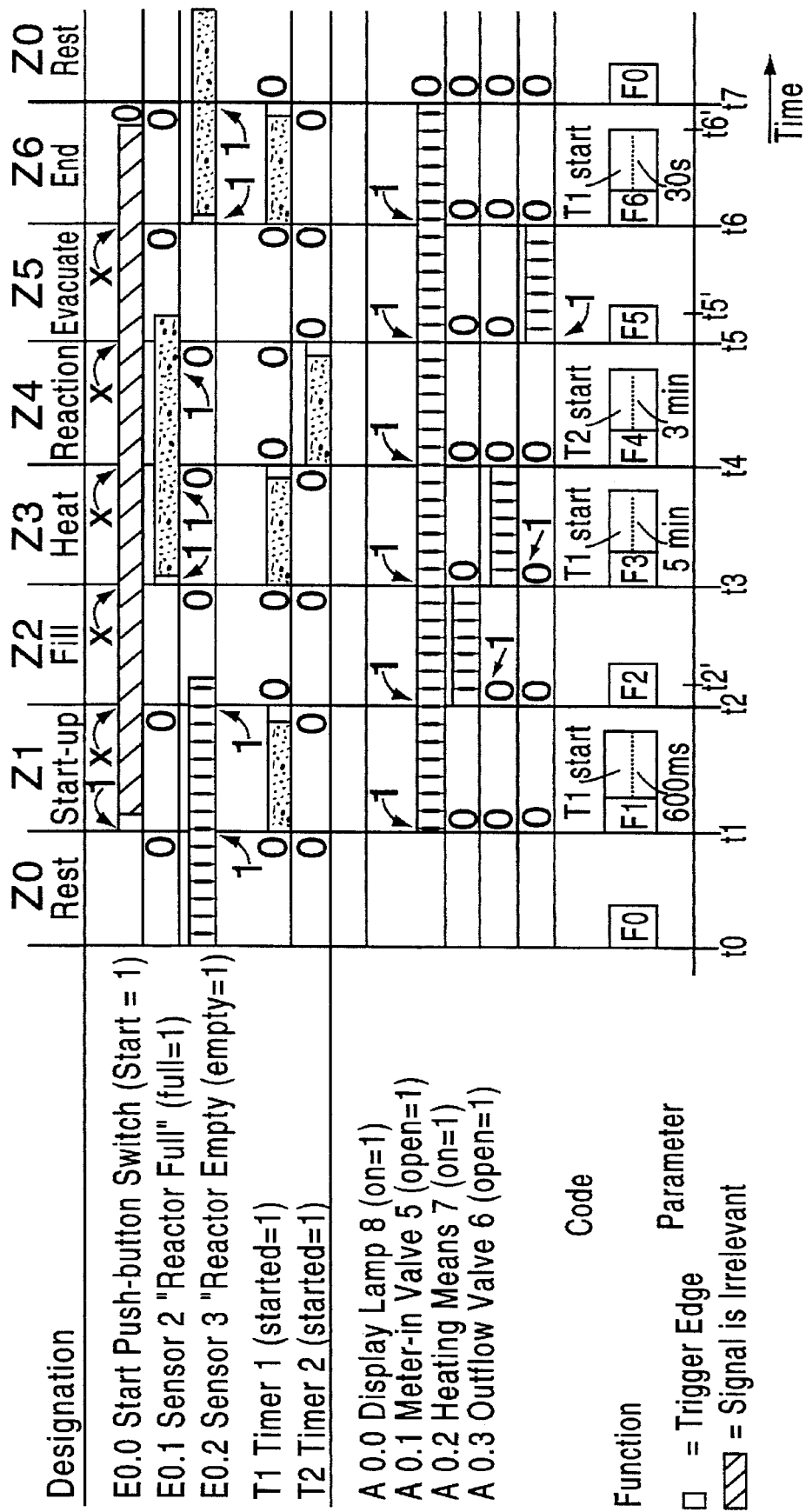
Figure 3:
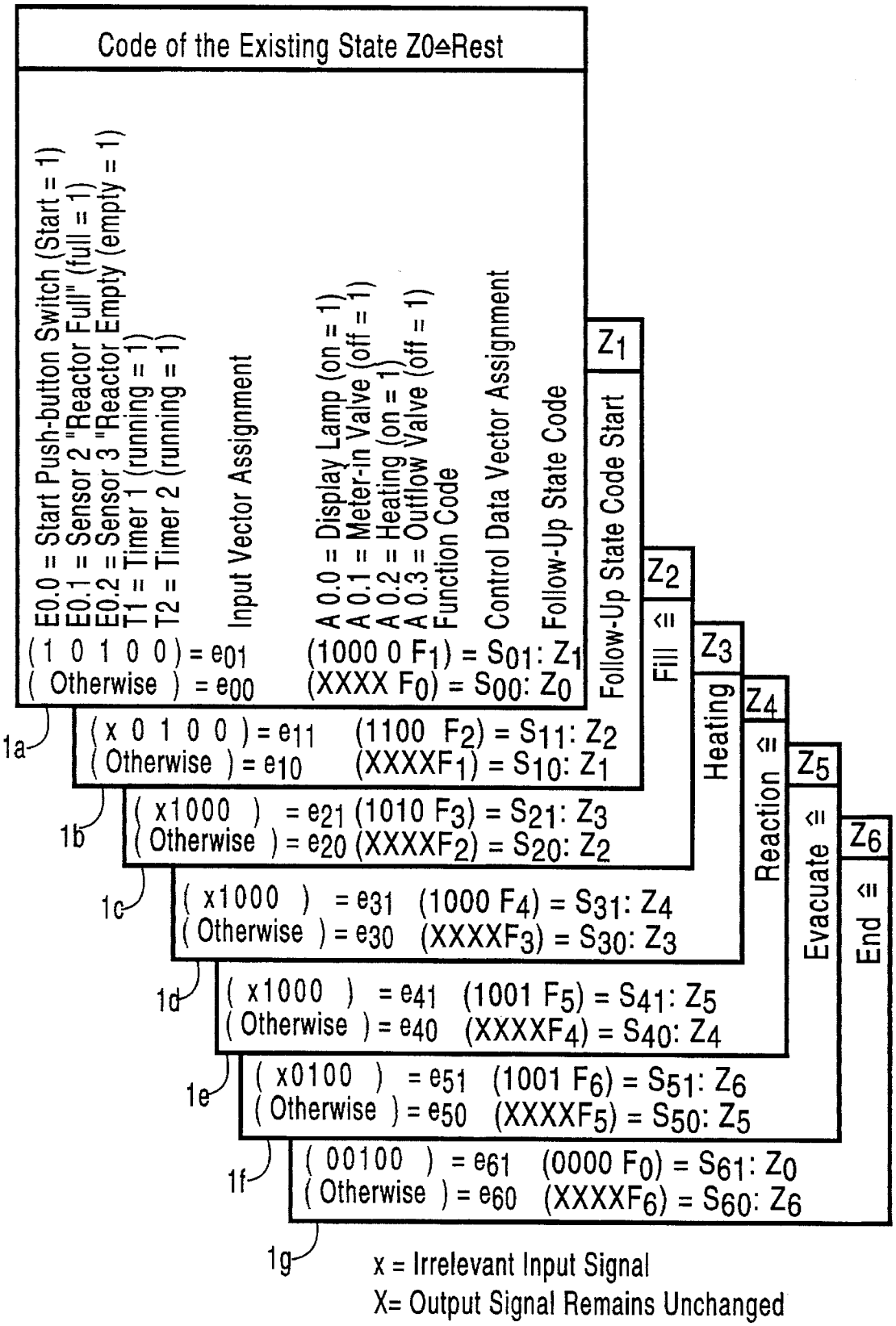

The Figures show:

FIG. 1 schematically a system controlled by a storage-programmable state control;

FIG. 2 a representation of input and output signals occurring in FIG. 1 in the form of an action-time diagram; and FIG. 3 a control program for the storage-programmable state control.

In FIG. 1, 9 denotes a storage-programmable state control, which controls a reactor 1 on the basis of input signals E0.0, E0.1 and E0.2. The input signal E0.0 indicates that a reactor cycle is started by a push-button switch 4, and the input signals E0.1, E0.2 generated by sensors 2, 3 that the reactor is full or empty. An output signal A0.0 is fed to an alarm lamp 8 and indicates the beginning of the reactor cycle. Output signals A0.1, A0.3 are applied to valves 5, 6 to control the inflow and outflow of a reactor fluid, and an output signal A0.2 effects the heating of the reactor 1 by means of a heating element 7.

At this point, a control task prescribes that a reactor cycle is to be started by the push-button switch 4 and indicated by the alarm lamp 8. 600 milliseconds after the start-up operation, the meter-in valve B of the empty reactor 1 is to be opened; the outflow valve 6 must be closed during a filling operation. In addition, the control task prescribes that the meter-in valve 5 must be closed in the case that the reactor is full and that thermal energy is to be supplied to the fluid in the reactor 1 for five minutes via the heating element 7. A reaction time of three minutes is subsequently provided, during which the fluid reacts to the supply of heat. If the three minutes have elapsed, the reactor must be evacuated. For this purpose, the meter-in valve 5 is closed and the outflow valve 6 is opened. When the reactor 1 is empty, after a recovery time of 30 seconds, the alarm lamp 8 is switched off, and it is thus indicated that the reactor cycle is complete, and a new cycle can be started.

This thus formulated control task is converted by a programmer using a programming unit (not shown here) into an action-time diagram. To this end, the programming unit provided with a display device and a memory device has a software tool, which is stored in the memory device and also contains instructions and commands for graphically displaying the action-time diagram on the display device.

To solve the formulated control task, an action-time diagram is set up, which is depicted in binary form in FIG. 2 with the input and output signals E0.0 ... , A0.0 ... occurring in FIG. 1. Furthermore, depicted as additional output variables are function codes F0 ... F6, which represent the duration of states Z0 . . . Z6 according to timer settings of the state control 9. These function codes form internal binary input signals T1, T2, which, in accordance with the specifications described in the task, control the heating and reaction time, as well as the delay times with regard to opening the meter-in valve 5 and switching off the alarm lamp 8. The states Z0 . . . Z6 signify the states "rest", "start-up", "fill", "heat", "reaction", "evacuate", and "end". To program a control program for the storage-programmable state control 9 to solve the control task, it is now necessary for the action-time diagram to be further processed by the software tool.

To clarify the type and method of further processing, reference is first made to FIG. 3. The Figure shows a control program in the form of a control table that is likewise displayable to the display device, which is produced from the action-time diagram in accordance with FIG. 2, as will be shown in the following. The same signals illustrated in FIGS. 2 and 3 are provided with the same reference numerals. For better clarity, the control table is subdivided into blocks 1a . . . 1g, of which each block is assigned to one state Z0 . . . Z6 and is stored in corresponding storage areas of the memory device. $e_{ij}$ signifies input vector assignments, which are generated from the binary values of the input signals E0.0 . . . T1, T2; and $S_{ij}$ signifies control data vector assignments generated from the binary values of the output signals A0.0 . . . and from the function codes F0 . . . F6, i being=0, 1 . . . 6; j being=0, 1. Furthermore, the symbol x signifies that the binary value of an input signal E0.0 assigned to this symbol is irrelevant, i.e., the corresponding input and control data vector is produced independently of the binary value of this input signal. The symbol x in the control data vector assignment indicates that the binary values of the output signals A0.0 . . . remain unchanged given corresponding input vector assignments.

The further processing of the action-time diagram (FIG. 2) for creating the control program by the software tool will be clarified in greater detail in the following. The input signals E0.0 . . . T1, T2 are sampled at instants greater than t0, and level transitions of these signals are searched for, in which case considering the rest state Z0 as the start-up state does not signify any restriction of the whole. In the illustrated example, the first level transition in the input signals E0.0 . . . occurs at the instant t1, and, in fact, these are the signals E0.0 and T1. At the instant t1, the start push-button switch 4 (FIG. 1) is actuated, through which means the internal timing circuit of the state control 9 is started; then in accordance with the stipulations of the control task, the meter-in valve 5 is not to be opened until after 600 milliseconds. This start-up operation is indicated at the instant t1 by the alarm lamp 8 (A0.0=1). The start-up of the signal T1 is dependent upon the actuation of the push-button switch 4, through which means the input signal E0.0 is generated. For that reason, the edge (level transition) of the input signal E0.0 is significant as a triggering edge. The software tool searches for the binary value (level value) of this signal E0.0 at an instant T1+$\Delta$ta, and the binary values (level values) of the input signals E0.1, E0.2, T1 and T2 at an instant T1−$\Delta$tb and, from these values, produces an input vector $$e_{01}=(E0.0, E0.1, E0.2, T1, T2)=(10100)$$

(compare FIG. 3, block 1a). The time spans $\Delta$ta and $\Delta$tb are selected so as to allow binary values to be considered shortly before or after a level transition. The time spans $\Delta$ta, $\Delta$tb can be selected to be equally long, which will be assumed in the following and will be expressed with a reference symbol $\Delta$t. At the instant t1+$\Delta$t, a control data vector is generated from the binary values (level values) of the output signals A0.0 . . . and from the function code F1 of the function "start timer signal T1" and yields:

$$S_{01}=(A0.0, A0.1, A0.2, A0.3, F1)=(1000F1).$$

At the instant t1+$\Delta$t, the sequential follow-up state Z1 ("start") is allocated to the input vector assignment $e_{01}$ in the instantaneous state Z0 ("rest") of the state control 9, through which means this state control changes over during the processing of the control table when the input vector assignment $e_{01}$ occurs from the instantaneous state Z0 to the sequential follow-up state Z1 and applies the control data in accordance with the control data vector assignment to the reactor 1. On the other hand, other combinations of the input signal levels effect that the state control 9 remains in the instantaneous state Z0, which is described in the control table in the block 1a by the input vector assignment $e_{00}$, which is valid for all other combinations of the input signal levels E0.0 . . . , T1, T2. For this case, the control data of the control data vector $S_{00}$ applied to the reactor 1 remain unchanged, and the function code F0, which does not trigger any function and is assigned to the instantaneous state Z0, remains active.

Another level transition occurs in the present instantaneous state (now state Z1) at an instant t2 in the input signal T1. The level changes from "1" to "0", which indicates that the 600 milliseconds of the timing circuit have elapsed.

The binary value of the signal T1 at an instant t2+$\Delta$t is 0, the binary values of the output signals A0.0, . . . at this instant are 1, 1, 0, 0 and those of the remaining input signals E0.0, E0.1, E0.2 and T2 at an instant t2−$\Delta$t x, 0, 1 and 0, through which means, an input-vector and control-data-vector assignment are produced $$e_{11}=(x0100)$$

and $$S_{11}=(1100F2).$$

while taking into consideration the function code F2 that again does not trigger any function in the present example.

The sequential follow-up state Z2 is assigned to the input vector assignment $e_{11}$ in the instantaneous state Z1. Other input signals E0.0 . . . T1, T2 in the instantaneous state Z1 do not effect any change in the state and any change in the control data, through which means the state control 9 remains in the instantaneous state Z1.

In accordance with the previously described type and method, the action-time diagram is processed by the software tool at instants t3, t4, t5, t6 and t7, for which the input signals E0.1, T1, T2 and E0.2 have relevant level transitions. As depicted in the blocks 1c through 1g (FIG. 3), input-and control-data-vector assignments are produced:

$$e_{ij}, S_{ij}, i=2 \ldots 6; j=0,1,$$

the corresponding sequential follow-up states Z3 . . . Z6, Z0 being assigned to the input vectors $e_{ij}$.

For the sake of completeness, reference is also made to irrelevant level transitions of the input signals E0.2, E0.1 and E0.0 at instants t2', t5' and t6'. At the instants t2'and t5', an input signal combination of E0.1=0 (reactor not empty) and E0.2=0 (reactor not full) results in accordance with the previously described processing steps. This combination which is not unequivocal with respect to the filling operations is recognized by the software tool, through which means these level transitions continue to be ignored for a further evaluation. At the instant t6', an input combination E0.0=0 and T1=1 results, which indicates that the change cannot be made from the end of this state to the rest state Z0, since the set time of 30 seconds of the timing circuit has not yet elapsed. To ensure that irrelevant level transitions do not have to be processed by means of an appropriate evaluation by the software tool, the relevant level transitions are advantageously marked, which is indicated in FIG. 2 by level transitions marked by triggering edges (drawn in with black bars in the input signals).

The control table depicted in FIG. 3 is transferred to the storage-programmable state control, which, while following the stipulations of this table, solves the control task in accordance with the older German Patent Application P 42 26 456.1 and with the German laid open print 37 43 438. The transfer can be effected in that the control table is read out of the memory of the programming unit, written to a disk or a storage module, and is transferred from there into the user memory of the state control. The transfer can, of course, also take place on-line via an appropriate link between the programming unit and the state control. The software tool is advantageously designed to allow the corresponding action-time diagram to also be produced from a preselected control table, since all information of the action-time diagram is clearly reversibly mapped in the control table.

In the depicted exemplary embodiment, the programmer creates the action-time diagram using the programming unit. It is, of course, possible to record real input and output signals as measurable quantities of an already running process and to display them in an action-time diagram. In this case, one must allow for transient phenomena (reactions) when selecting the time spans $\Delta ta$, $\Delta tb$ and $\Delta t$.

I claim:

1. In a programming unit for a storage-programmable state control with a memory device, in which is stored a control task created with a software tool in the form of an action-time diagram, which is displayable on a display device and describes input and output signals of a technical process to be controlled in the form of binary and/or analog signals, a method for creating a control program having control and status codes to solve the control task starting out from an instantaneous state, the method comprising steps of:

a) searching for instants ti at which signal level transitions of the input signals occur;

b) searching for a signal level value of the input signal exhibiting the level transition determined at any one time at an instant $ti+\Delta ta$, wherein $\Delta ta$ is a first specifiable time span;

c) searching for signal level values of the remaining input signals at an instant $ti-\Delta tb$, wherein $\Delta tb$ is a second specifiable time span;

d) searching for signal level values of the output signals at the instant $ti+\Delta ta$;

e) generating an input vector from the signal level values of the input signals that were searched for;

f) generating a control data vector from the signal level values of the output signals that were searched for; and g) allocating the input vector to a sequential follow-up up state at the instant $ti+\Delta ta$.

2. The method of claim 1 wherein the first specifiable time span $\Delta ta$ is the same as the second specifiable time span $\Delta tb$.

3. The method of claim 1 further comprising a step of marking relevant level transitions in the action-time diagram.

4. The method of claim 1 wherein the action-time diagram can be reconstructed from the control program.

* * * * *